Patented Sept. 5, 1922.

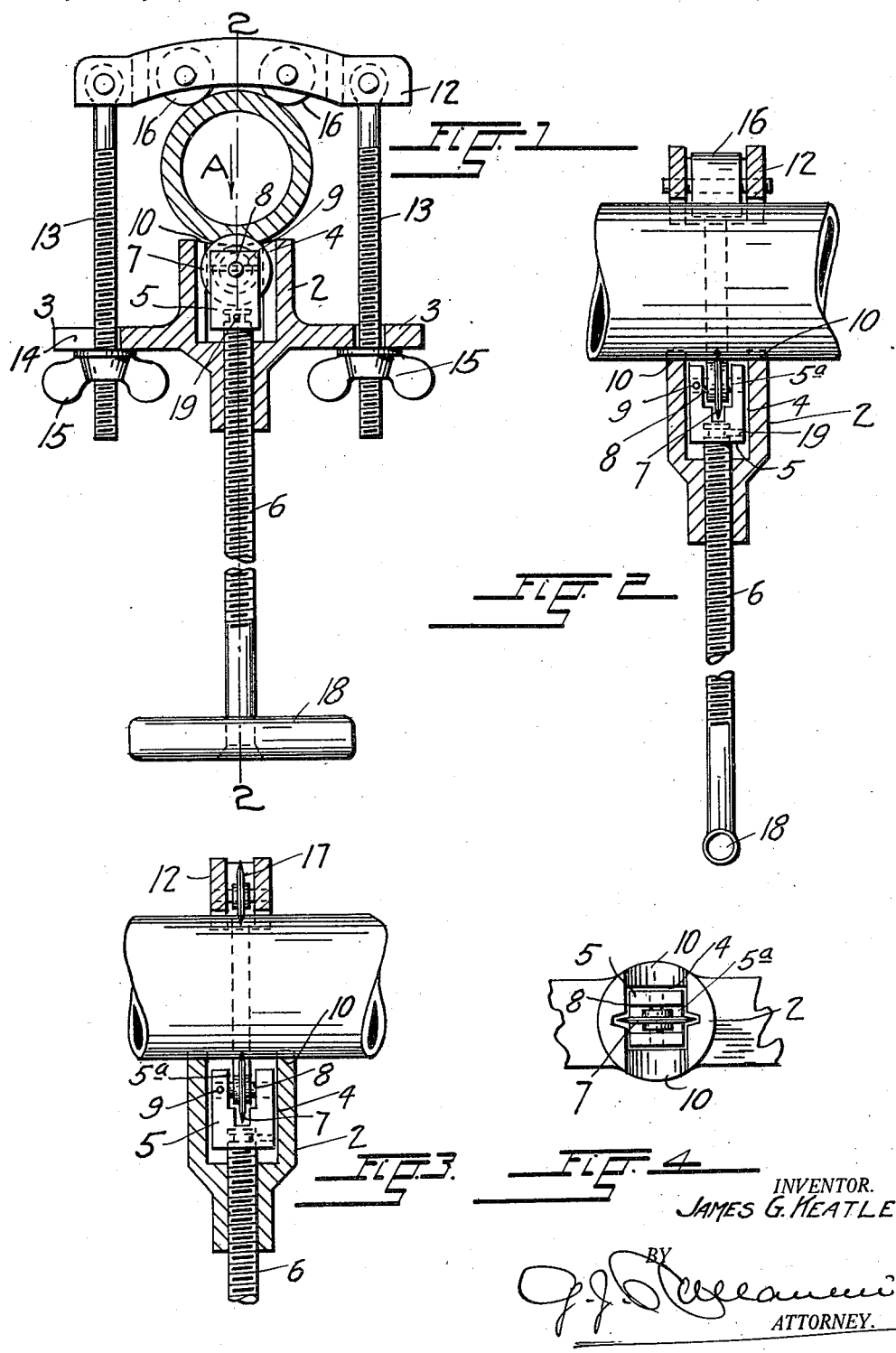

1,428,288

UNITED STATES PATENT OFFICE.

JAMES G. KEATLEY, OF DENVER, COLORADO.

PIPE CUTTER.

Application filed July 20, 1921. Serial No. 486,073.

*To all whom it may concern:*

Be it known that I, JAMES G. KEATLEY, a citizen of the United States, residing at Denver, in the county of Denver and State of Colorado, have invented certain new and useful Improvements in Pipe Cutters, of which the following is a specification.

This invention relates to pipe cutters and it has for its object to provide a tool of simple, strong and practical construction which when drawn around the pipe will sever the same in a plane at right angles to its longitudinal axis so as to produce a true and square cut.

Another object of the invention is to provide a cutter which is readily adjusted to accommodate pipes of different diameters.

A further object is to provide a mounting for the cutting member of the tool which relieves it from lateral stress and thereby permits of its being made of thinner metal than that ordinarily used in tools of this character.

Another object is to mount a rotary cutting member of the tool so that its pivot pin is permanently held against displacement, and still further objects reside in details of construction and a novel arrangement of parts to be hereinafter fully described.

An embodiment of my invention is illustrated in the accompanying drawings in the various views of which like parts are similarly designated, and in which Figure 1 is a sectional elevation of my improved pipe cutting tool;

Figure 2, a section on the line 2—2, Figure 1;

Figure 3, a fragmentary section similar to that of Figure 2, showing a modification of the construction, and Figure 4, a fragmentary end view of the stock of the tool, looking in the direction of the arrow A, Figure 1.

Referring to the drawings the reference character 2 designates the stock of the tool which consists of a solid body of preferably cylindrical form, provided with integral laterally projecting and longitudinally alined ears 3. The stock has an axial socket 4 of angular section to receive a cutting head 5 at the end of a feed screw 6 which passes through a correspondingly screw threaded opening of the stock formed axially in alinement with the socket.

The cutting head which is slidably fitted in the socket consists of a rectangular block in which the circumferentially grooved end portion of the screw is swiveled through the medium of a pin 19. The block has a central slot 5ᵃ to receive a disk shaped cutter 7 rotatably supported upon an arbor 8 which fits snugly in alined openings of the portions of the head at opposite sides of its slot. A transverse pin 9 driven through apertures in one of these portions and the corresponding part of the arbor serves to firmly secure the latter against displacement and grooves in opposite sides of the socket are formed to freely admit the marginal portion of the rotary cutter.

The parts of the tool so far described are formed and relatively arranged so that when by rotation of the feed screw the end of the cutting head is flush with the socketed end of the stock the cutter wheel is outside the socket to the full extent of its cutting depth.

It will be seen that by this arrangement the arbor upon which the cutter is mounted remains permanently inside the socket and that all stress to which the cutter is subject in the operation of the tool is sustained by the solid stock in which the cutter head is fitted.

The stock has in its end at opposite sides of the opening of its socket through which the cutter wheel protrudes in the operation of the tool, shallow concave depressions 10 which conjointly form a seat for the pipe to be cut.

In the operation of the tool the pipe is clamped in fixed engagement with the seat at the end of the stock by a yoke 12 which is adjustably connected with the ears 3 of the stock by means of screw bolts 13. The bolts which are pivoted in open ended slots at the ends of the yoke pass freely through openings in the ears and one of these openings is cut through the end of the ear, as at 14, to permit of the ready withdrawal and replacement of the respective bolt for the application of the tool to a length of pipe without its being passed across an end thereof. Wing nuts 15 cooperate with the bolts to draw the yoke into contact with the pipe and rollers 16 mounted on the yoke at opposite sides of its center engage with the circumferential surface of the pipe to facilitate rotation of the tool.

In order to accelerate the cutting action of the tool the rollers of the yoke may be replaced by cutting wheels 17 similar in size and construction to that which is mounted on the stock, as shown in Figure 3 of the drawings.

In the operation of my invention, the pipe is placed upon the concaved seats at the end of the stock after the cutting head and the cutter wheel are withdrawn inside the socket of the same. The pipe is fixedly mounted in engagement with the seat by drawing the yoke tight against its opposite surface through the instrumentality of the wing-nuts of the screw bolts.

It will be evident that the pipe in this position is at right angles to the cutting plane of the cutter wheel and that when the tool is subsequently moved around the pipe, and the cutter wheel is fed to the circumferential surface of the same through the medium of the screw 6, a straight cut at right angles to the longitudinal axis of the pipe is assured.

The cutter is readily removed from the stock for sharpening or repairing and the tool is easily applied at any portion of the pipe to be cut by withdrawing the one screw bolt from the slotted opening in the end of an ear of the stock and moving the yoke about the pivot of the bolt.

Owing to the means provided to hold the tool against lateral movement while it is drawn around the pipe and the mounting of the cutting head within the socket of the solid stock, the stresses to which a cutter of a tool of this character is ordinarily subjected, are reduced to the minimum and the cutting action may be facilitated by making the cutting wheel of thin steel reenforced by a central hub through which the arbor passes.

The screw by which the cutting wheel is fed to the work also serves as a handle to rotate the tool around the pipe and it has at its extremity a cross arm 18 which facilitates its manipulation.

Having thus described my invention what I claim and desire to secure by Letters-Patent is:

1. A pipe cutter comprising a stock having a socket and a rigid pipe-seat at an end thereof, means connected with the stock to hold a pipe to the seat thereof, a grooved cutter-head slidably fitted in the socket of the stock, a cutter wheel mounted in the groove of the head, and a feed screw working in the stock in connection with the cutter head.

2. In a pipe cutter, a stock having an axial socket and integral pipe-seats at opposite sides of an end thereof, a grooved cutter head slidably mounted in said socket, a rotary cutter disk in the groove of the head, a feed screw working in the stock, in connection with the cutter head, and means connected with the stock for holding a pipe to the seats thereof.

3. In a pipe cutter, a stock having an axial socket and pipe-seats at opposite sides of an end thereof, a centrally grooved cutter head slidably mounted in said socket, a rotary cutter disk in the groove of the head, a feed screw working in the stock, in connection with the cutter head, and means connected with the stock for holding a pipe to the seats thereof.

4. In a pipe cutter, a stock having spaced and rigid seats, a cutter head movably mounted between the seats, a rotary cutting disk mounted on the head, a screw working in the stock to feed the cutter disk to a pipe engaging with the seats, and means connected with the stock to engage the pipe in the circle of contact of the cutting member with the pipe.

In testimony whereof I have affixed my signature.

JAMES G. KEATLEY.